United States Patent [19]

Burton

[11] Patent Number: 5,098,132

[45] Date of Patent: Mar. 24, 1992

[54] LENGTH COMPENSATING JOINT

[75] Inventor: James A. Burton, Houston, Tex.

[73] Assignee: Cooper Industries, Inc., Houston, Tex.

[21] Appl. No.: 536,694

[22] Filed: Jun. 12, 1990

[51] Int. Cl.⁵ .............................................. F16L 35/00
[52] U.S. Cl. ........................................ 285/18; 285/31; 285/93; 285/96; 285/101; 285/111
[58] Field of Search ................. 285/93, 96, 101, 111, 285/106, 18, 31, 917; 277/207 A, 236, 205, 206 R, 27, 71, 72, 73

[56] References Cited

U.S. PATENT DOCUMENTS

| | | | |
|---|---|---|---|
| 3,647,226 | 3/1972 | Middelkoop et al. | 277/206 |
| 3,711,123 | 1/1973 | Arnold | 285/96 X |
| 4,059,288 | 11/1977 | Mohr | 285/101 X |
| 4,078,832 | 3/1978 | Wittman | 285/96 X |
| 4,200,312 | 4/1980 | Watkins | 285/96 X |
| 4,436,325 | 3/1984 | Miller | 285/18 |
| 4,696,494 | 9/1987 | Schmitz et al. | 285/18 |
| 4,720,124 | 1/1988 | Taylor et al. | 285/18 |
| 4,761,023 | 8/1988 | Troxell, Jr. | 285/18 |
| 4,877,272 | 10/1989 | Chevallier | 285/111 |

Primary Examiner—Randolph A. Reese
Assistant Examiner—Timothy Aberle
Attorney, Agent, or Firm—Jackie Lee Duke; Nelson A. Blish; Alan R. Thiele

[57] ABSTRACT

An improved length compensating joint suitable for use in repairing pipelines includes an inner tubular member, an outer tubular member which receives the inner member in close fitting engagement, seals disposed radially and axially between the inner and outer members define annular piston areas for providing selective relative motion between the inner and outer members, a pressure responsive locking piston with a camming surface for urging gripping elements into locking engagement with the inner member, a metal-to-metal seal between the inner and outer members which can be deenergized during extension or retraction operations and a test port for verifying the integrity of the metal-to-metal seal after installation. Additionally, a second embodiment provides an alternative metal-to-metal seal configuration which can also be deenergized during extension and retraction operations.

5 Claims, 8 Drawing Sheets

LENGTH COMPENSATING JOINT

BACKGROUND

Length compensating joints or telescoping joints are well known in the field of pipeline repair. Typically these apparatuses have been used onshore and offshore to allow for length adjustment when a section of pipeline is being replaced to minimize the amount of cutting and welding which is required. Particularly in offshore installations where access to the pipeline is difficult and costly, it is desirable that the length compensating joint be remotely operable with a reliable sealing means, preferably metal-to-metal. The present invention provides an improved seal structure which has these features.

The present invention is an improvement of the structure covered by the J. N. Troxell, Jr. U.S. Pat. No. 4,761,023. The Troxell telescoping joint discloses a metal-to-metal seal which can be energized or released by a pressure responsive means.

The W. M. Taylor et al. U.S. Pat. No. 4,720,124 discloses a telescoping joint with metal-to-metal sealing and locking surfaces disposed on the exterior and interior surfaces, respectively, of the inner and outer tubular members. Hydraulic pressure is used to disengage the sealing surfaces and provide relative movement between the inner and outer tubular members.

The T. R. Schmitz et al. U.S. Pat. No. 4,696,494 discloses an adjustable flowline joint which provides angular misalignment capability only and a hydraulically releasable locking means with metal-to-metal seals.

The J. E. Miller U.S. Pat. No. 4,436,325 discloses an adjustable locking coupling with metal-to-metal sealing and hydraulically actuated locking means. No provision is made for unlocking the coupling after installation.

SUMMARY

The present invention pertains to an improved length compensating joint with a metal-to-metal bore seal. The improved length compensating joint includes an inner tubular member, an outer tubular member, annular hydraulic chambers between the tubular members with suitable sealing means for extending and retracting the tubular members, means for locking the inner tubular member with respect to the outer tubular member and resilient sealing means arranged to allow hydraulic force to unseat the metal-to-metal seal when it is desired to extend or retract the tubular members.

An object of the present invention is to provide an improved length compensating joint with a metal-to-metal seal which is mechanically energized upon installation and eliminates the need for additional activation means.

Another object is to provide an improved length compensating joint with a simple hydraulic means for deactivating the metal-to-metal seal when it is desired to shorten or lengthen the joint.

A further object of the present invention is to provide an improved length compensating joint whose metal-to-metal sealing means functions independently of the joint locking means.

BRIEF DESCRIPTION OF THE DRAWINGS

These and other objects and advantages of the present invention are set forth below and further made clear by reference to the drawings wherein.

DESCRIPTION OF THE PREFERRED EMBODIMENT

Figure 1A:
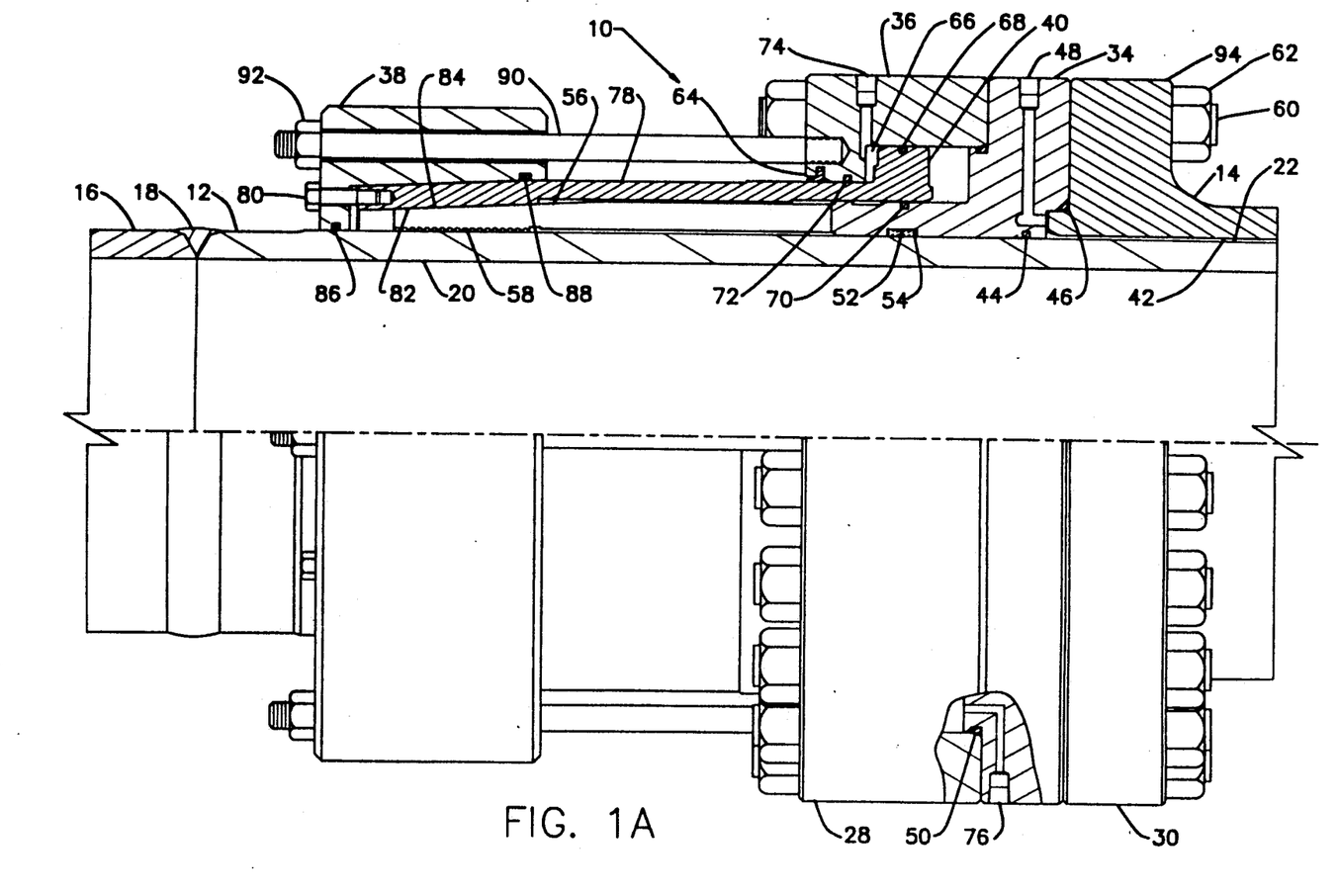
FIGS. 1A and 1B are elevational views, partly in section, of the improved length compensating joint in a retracted and unlocked position with FIG. 1A being the left portion and FIG. 1B being the right portion thereof.
Figure 1B:
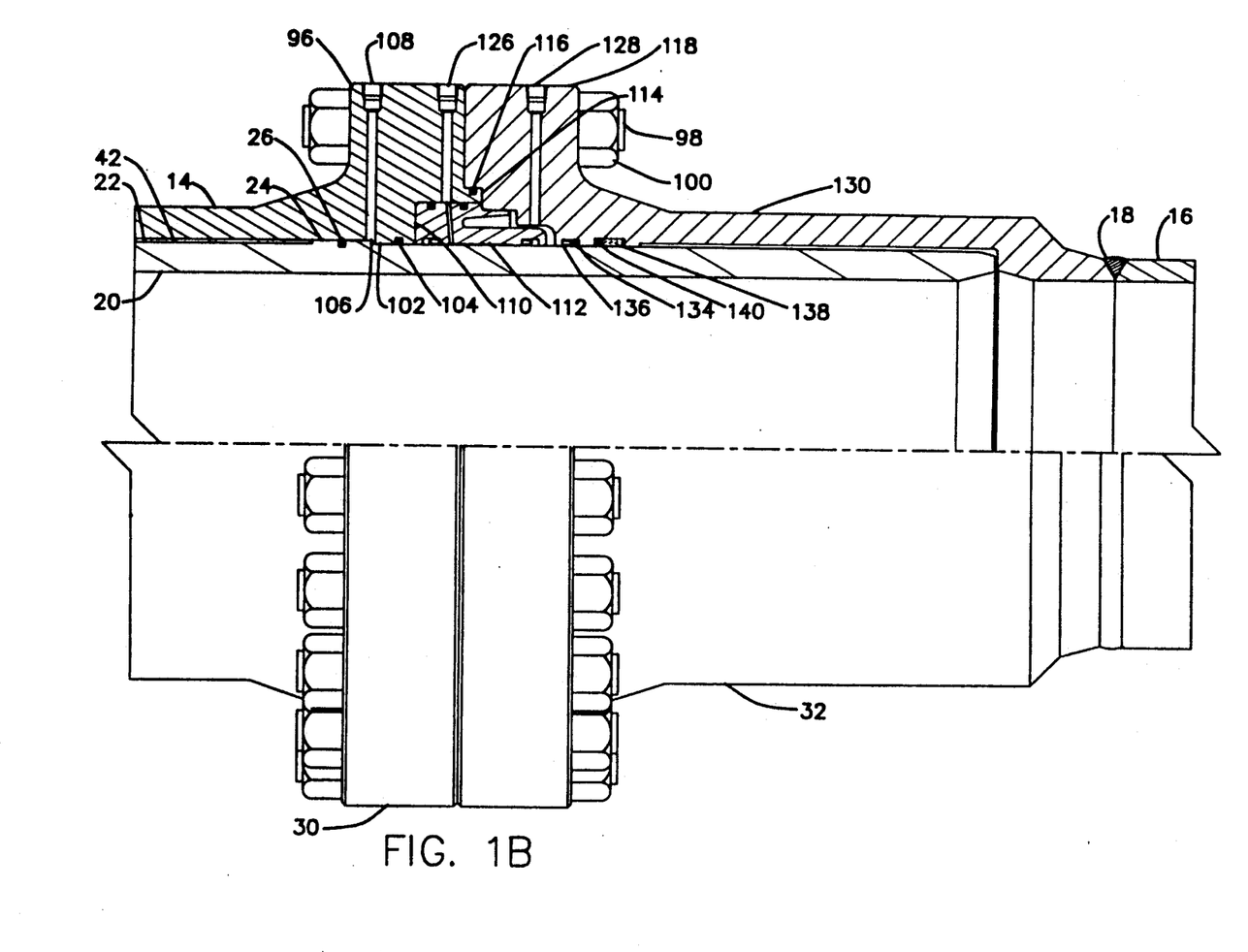

With reference to FIGS. 1A and 1B, the improved length compensating joint of the present invention, denoted generally by numeral 10, is composed of inner tubular member 12 and outer tubular assembly 14. Adjacent both ends of the length compensating joint 10 are the ends of the pipeline 16 which are shaped to facilitate connection to the ends of the length compensating joint 10 by suitable means, such as welded joints 18.

Inner tubular member 12 is generally cylindrically shaped with its bore 20 concentric with that of the outer assembly 14. The outer surface 22 of inner tubular member 12 has raised annular portion 24 with sealing means such as O ring 26 disposed therein. Inner tubular member 12 is of sufficient length to protrude from outer tubular assembly 14 when in the fully retracted position as shown in FIGS. 1A and 1B.

The outer tubular assembly 14 is composed of lock assembly 28, adapter spool 30 and end spool 32. Lock assembly 28 includes end flange 34, middle flange 36, lock ring 38 and piston 40. End flange 34 has O ring 44 disposed in a groove on its interior which seals against the exterior of inner member 12 and with annular portion 24 of inner member 12 defines annular retraction chamber 42 therebetween. Pressure integrity of chamber 42 is assured by O ring 46 located between stepped shoulders on the abutting faces of adapter spool 30 and end flange 34. Port 48 provides means for introducing pressurized fluid into annular chamber 42 when it is desired to retract inner member 12. End flange 34 has a stepped lower shoulder with O ring 50 disposed therein which seals against the inside of middle flange 36. Annular recess 52 on the inside of end flange 34 has wear ring 54 disposed therein for maintaining flange 34 concentric with inner member 12. The lower portion of end flange 34 has collet fingers 56 extending therefrom with inner serrated surfaces 58 formed thereon for gripping inner member 12 in a manner to be described hereinafter.

Middle flange 36 abuts end flange 34 and is retained by suitable means such as studs 60 and nuts 62. Lower lip 64 of flange 36 extends radially inwardly toward end flange 34 and forms annular chamber 66 therebetween. Piston 40 is axially reciprocable therein. O ring 68 on the exterior of piston 40 and O ring 70 on the exterior of end flange 34 in combination with O ring 72 on the lower interior surface of middle flange 36 seal piston 40 within chamber 66 to allow for hydraulic reciprocation. Ports 74 and 76 provides means for introducing pressurized fluid into annular chamber 66 to cause such movement.

Piston 40 has tubular end portion 78 extending axially to lock ring 38 where bolts 80 provide suitable connection means. Interior camming surface 82 on end portion 78 is frustoconically shaped and cooperates with exterior frustoconical camming surface 84 of collet fingers 56 in a manner to be more fully described hereinafter to cause serrated surfaces 58 to grip inner member 12. Trash seals 86 and 88 are provided on the interior of lock ring 38. Studs 90 extend from the lower face of middle flange 36 through lock ring 38 and with nuts 92 provide a manual lock of collet fingers 56 when hydraulic pressure is removed from chamber 66.

Figure 3:
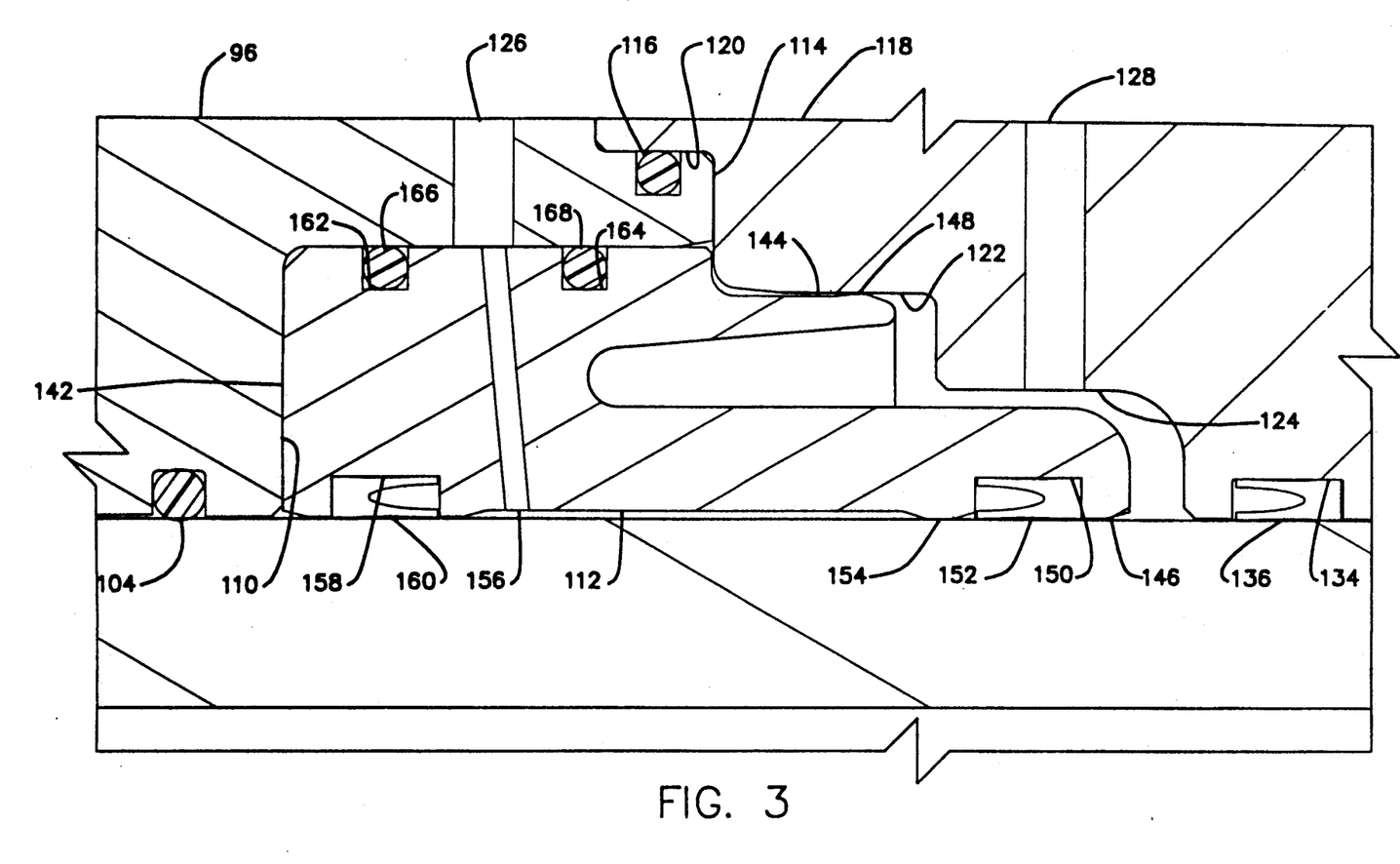
FIG. 3 is an enlarged sectional view of the metal-to-metal seal of the improved length compensating joint and its associated hydraulic porting.

Adapter spool 30 is a tubular member with flanges 94 and 96 at either end which allow attachment to end flange 34 by studs 60 and nuts 62 and connection to end spool 32 by studs 98 and nuts 100. The interior of flange 96 has reduced diameter annular portion 102 with O ring 104 thereon. Annular portion 102 and annular portion 24 of inner member 12 define extension chamber 106 therebetween with port 108 providing means for the introduction of pressurized fluid when it is desired to extend inner member 12. As best seen in FIG. 3, the end face of flange 96 has annular recess 110 on its interior which receives improved seal member 112. Raised lip 114 is located radially outwardly of recess 110 with O ring 116 on its exterior in sealing engagement with complementary mating flange 118 of end spool 32. The interior of flange 118 is stepped with axially spaced counterbores 120, 122, and 124 therein. Port 126 in flange 96 provides means for the introduction of pressurized fluid to deenergize seal 112 in a manner to be discussed hereinafter. Port 128 in flange 118 allows pressure testing of seal 112 upon installation. Tubular portion 130 extends axially from flange 118 and terminates in butt weld connection 18 of end spool 32. Seal groove 134 is located on the interior of tubular portion 130, spaced axially from bore 124, with elastomer lip seal 136 therein. Annular recess 138 is displaced axially from seal groove 134 with wear ring 140 disposed therein to maintain end spool 32 concentric with inner tubular member 12.

As best seen in FIG. 3, improved seal member 112 is generally U shaped in cross section with a thick base portion 142 and outer leg 144 and elongated inner leg 146 extending therefrom. Outer leg 144 has enlarged annular portion 148 on its exterior which provides an initial metal-to-metal seal in counterbore 122. Inner leg 146 has greater radial thickness than inner leg 144 and extends axially beyond leg 144 with seal groove 150 disposed on its interior. Elastomeric lip seal 152 is oriented therein as shown. Enlarged annular portion 154 is displaced axially from groove 150 and provides an initial metal-to-metal seal between leg 146 and the exterior of inner member 12. Radially directed passage 156 is spaced axially from annular portion 154 and extends through base portion 142. Seal groove 158 s spaced axially below passage 156 with elastomeric lip seal 160 oriented therein as shown. The exterior of seal member 112 has seal grooves 162 and 164 on either side of radially directed passage 156 with O rings 166 and 168 disposed therein.

Figure 2A:
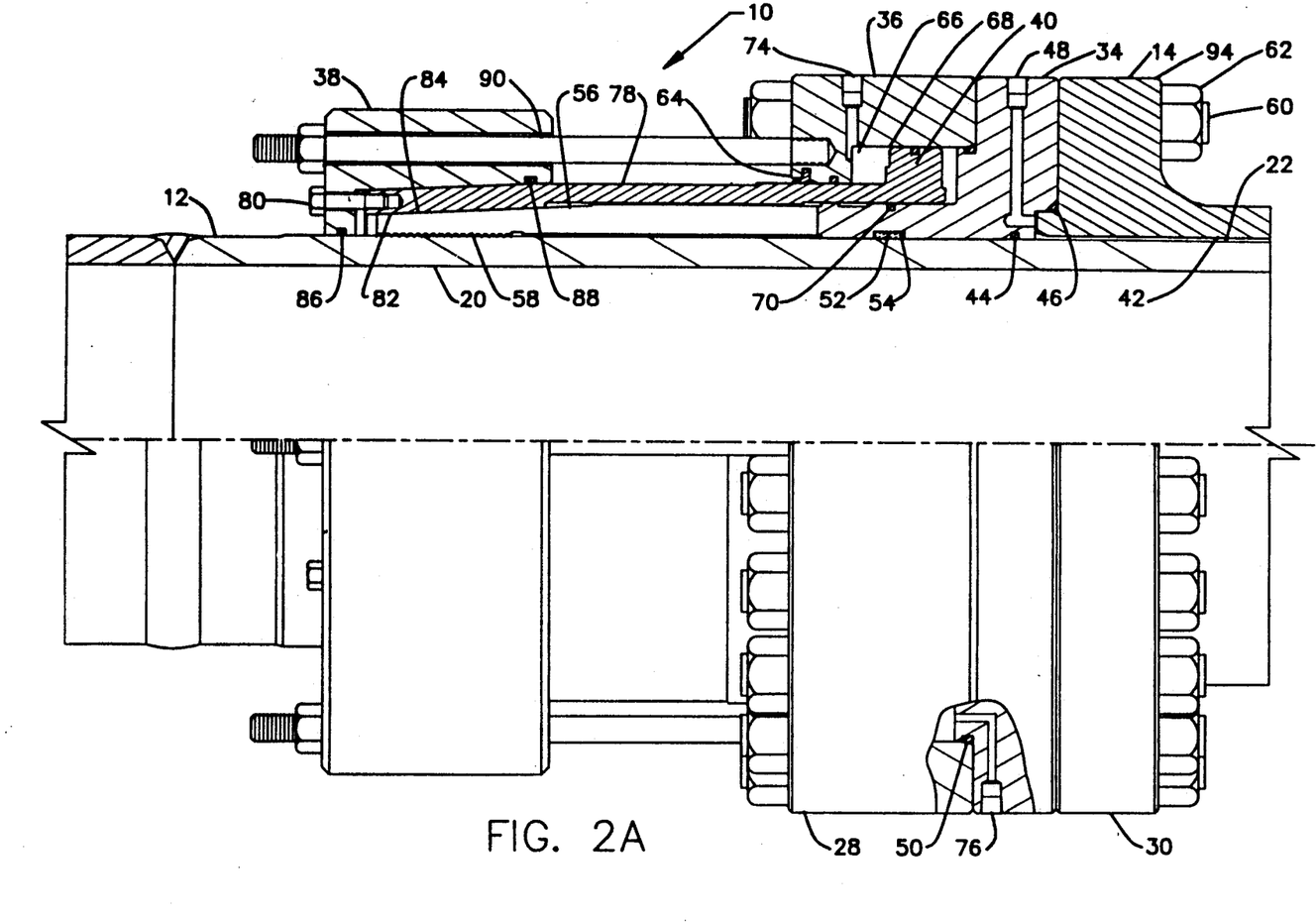
FIGS. 2A and 2B are similar views of the improved length compensating joint in an extended and locked position with FIG. 2A being the left portion and FIG. 2B being the right portion thereof.
Figure 2B:
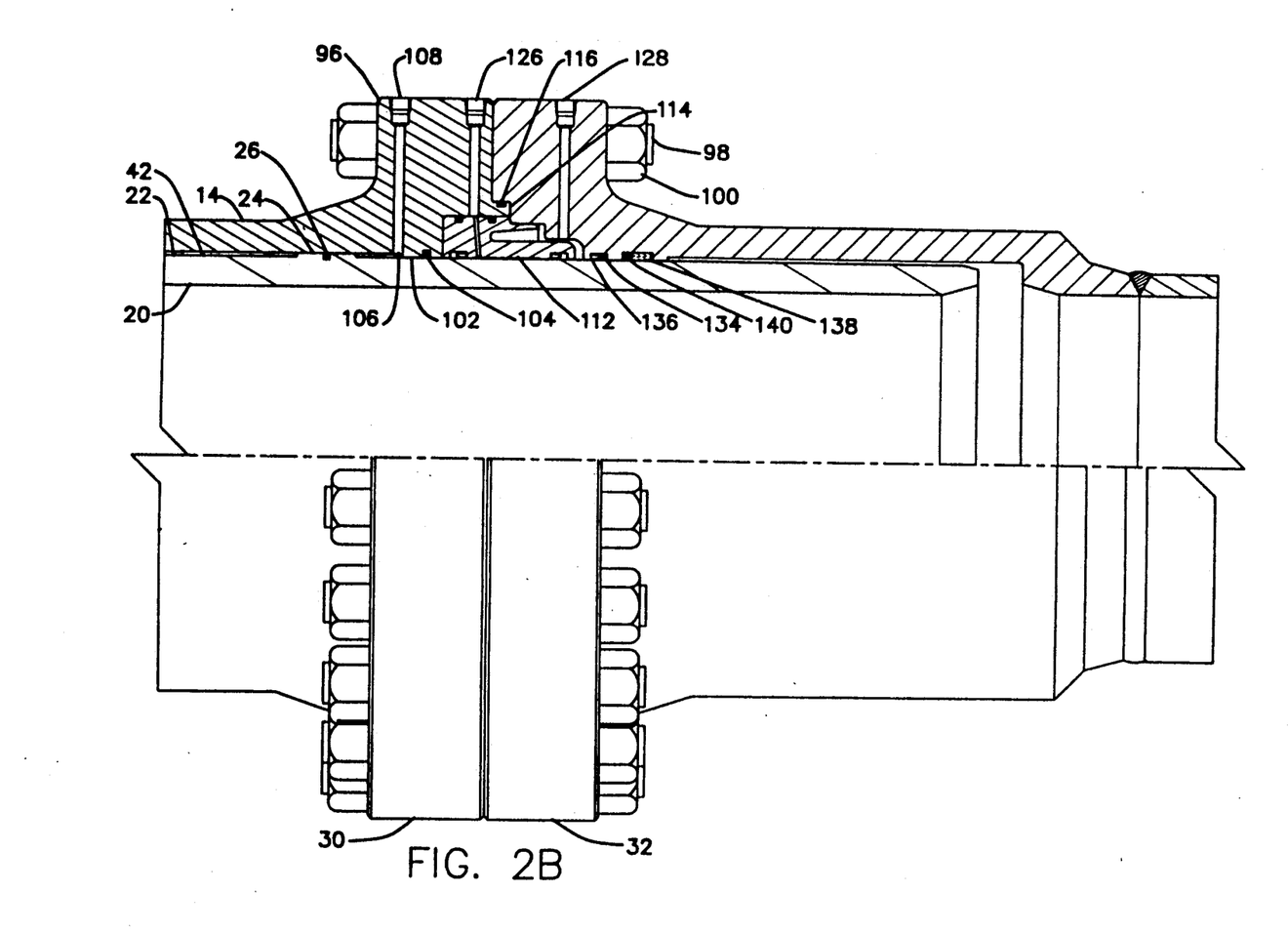

A typical sequence of operations for using the improved length compensating joint 10 in repairing a damaged section of pipeline begins with the damaged section of pipeline being cut free and removed from the pipeline 16. The improved length compensating joint of the present invention is lowered into a position adjacent the pipeline 16 and it is determined whether lengthening or shortening of the joint is required to allow the end connections to be made. If lengthening is required, pressurized fluid is injected in port 126 where it passes through port 156 to the interior of seal 112 and acts on seals 160 and annular seal 154. This pressurization causes inner seal leg 146 to move radially outward, lifting annular seal 154 from the exterior of inner member 112. Elastomeric lip seal 152 has sufficient resiliency to maintain sealing contact with the exterior of inner member 112 thus allowing annular metal-to-metal seal 154 to be maintained in a deenergized position. While metal-to-metal seal 154 is deenergized, pressurized fluid is supplied through port 108 to extension chamber 106, acting on the piston area between seals 26 and 104 to extend inner member 12, as seen in FIGS. 2A and 2B.

Similarly, if it is determined shortening of the length compensating joint is required, port 108 is vented while pressurized fluid is supplied through port 48 to retraction chamber 42, acting on the piston area between seals 26, 44 and 46 to retract inner member 12 to the desired position. The pressurized fluid is vented from the interior of seal 112 through ports 156 and 126, thus allowing inner seal lip 146 to return to its initial position and metal-to-metal seal 154 to engage the exterior of inner member 12. At this point, the improved length compensating joint 10 can be connected to pipeline 16 by suitable means such as welded joint 18.

While maintaining pressurized fluid in retraction chamber 42 and extension chamber 106 will keep length compensating joint 10 in the desired position, it is preferable to have a mechanical lock to maintain the desired position. This is accomplished with lock assembly 28 as best seen in FIGS. 1A and 1B. When it is desired to activate lock assembly 28, pressurized fluid is supplied through port 74 causing piston 40 and lock ring 38 to move to the right as shown in the drawings. This movement causes camming surface 82 of piston 40 to engage mating camming surface 84 thereby causing collet fingers 56 to deflect inwardly and serrated surfaces 58 to grip inner member 12. Nuts 92 are threaded further onto studs 90 by a remote operated vehicle to lock lock ring 38 and serrated surfaces 58 in position as shown in FIGS. 2A and 2B. If it desired to release lock assembly 28, nuts 92 are unthreaded and pressurized fluid is supplied through port 76 while venting port 74 thereby moving piston 40 and lock ring 38 to the left as shown in FIGS. 1A and 1B and thereby allowing collet fingers 56 to move outwardly and release inner member 12. With lock assembly 28 released, seal member 112 can be deenergized as described previously and inner member 12 extended or retracted as required. This method of operation allows the metal-to-metal seals 148 and 154 to be deenergized during extension and retraction of inner member 12 thereby lessening the chance of damaging the seal.

Figure 4A:
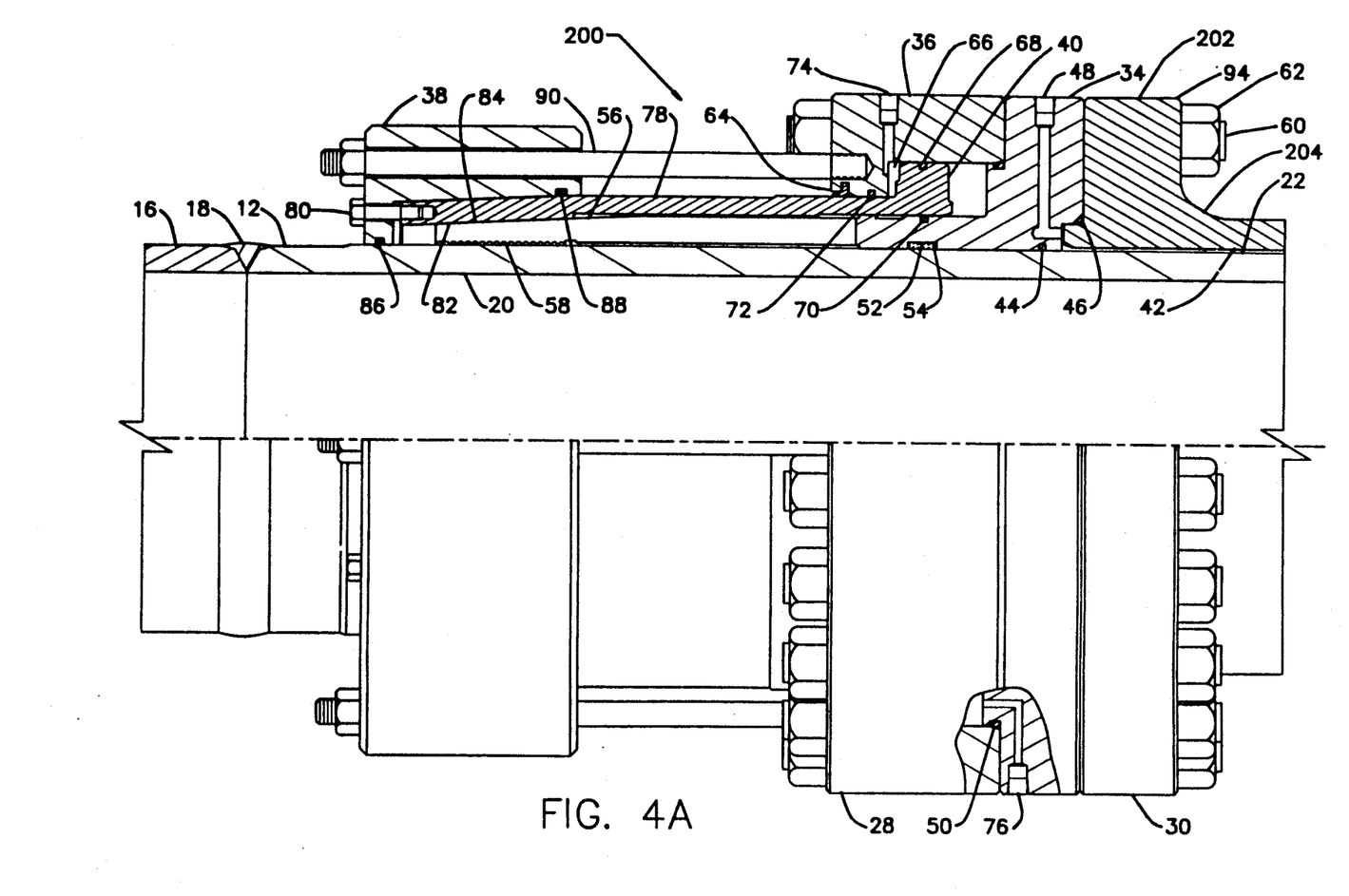
FIGS. 4A and 4B are elevational views, partly in section, illustrating an alternate metal-to-metal seal embodiment for the improved length compensating joint shown in a retracted and unlocked position with FIG. 4A being the left portion and FIG. 4B being the right portion thereof.
Figure 4B:
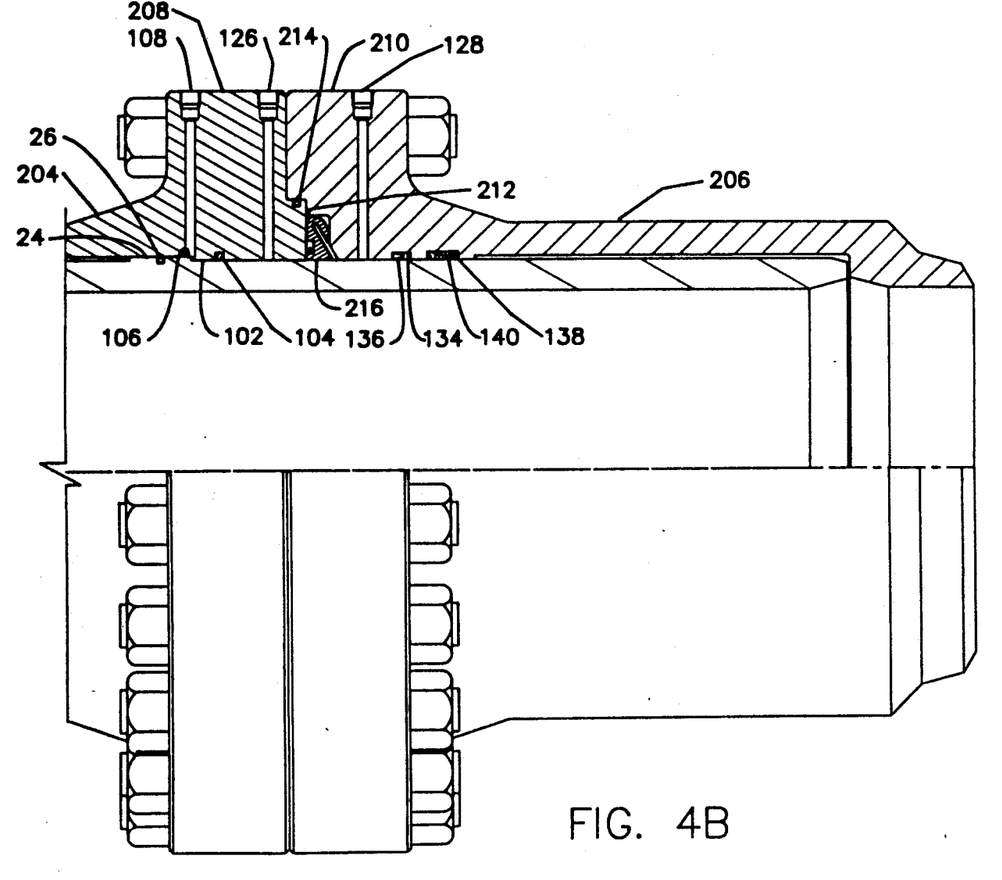

An alternate embodiment with a second metal-to-metal seal configuration between the inner and outer tubular members is shown in FIGS. 4A and 4B. Those items which are unchanged from the preferred embodiment retain the same numeral designation. The length compensating joint is denoted generally by numeral 200 and is composed of inner tubular member 12 and outer tubular assembly 202. Outer tubular assembly 202 consists of lock assembly 28, adapter spool 204 and end spool 206. Lock assembly 28 is secured to adapter spool 204 by suitable means such as studs 60 and nuts 62.

Adapter spool 204 is identical with adapter spool 30 except for flange 208 which is configured to sealingly engage complementary mating flange 210 of end spool 206. Flange 208 has seal 104 disposed on its interior in sealing engagement with the exterior of inner member 12 and with seal 26 defines extension chamber 106 therebetween with port 108 providing means for the introduction of pressurized fluid when it is desired to extend inner member 12. Flange 208 has a raised annular portion 212 on its end face with seal means 214 disposed on the exterior. Port 126 in flange 208 provides means for the introduction of pressurized fluid to deenergize metal-to-metal seal 216.

Figure 5:
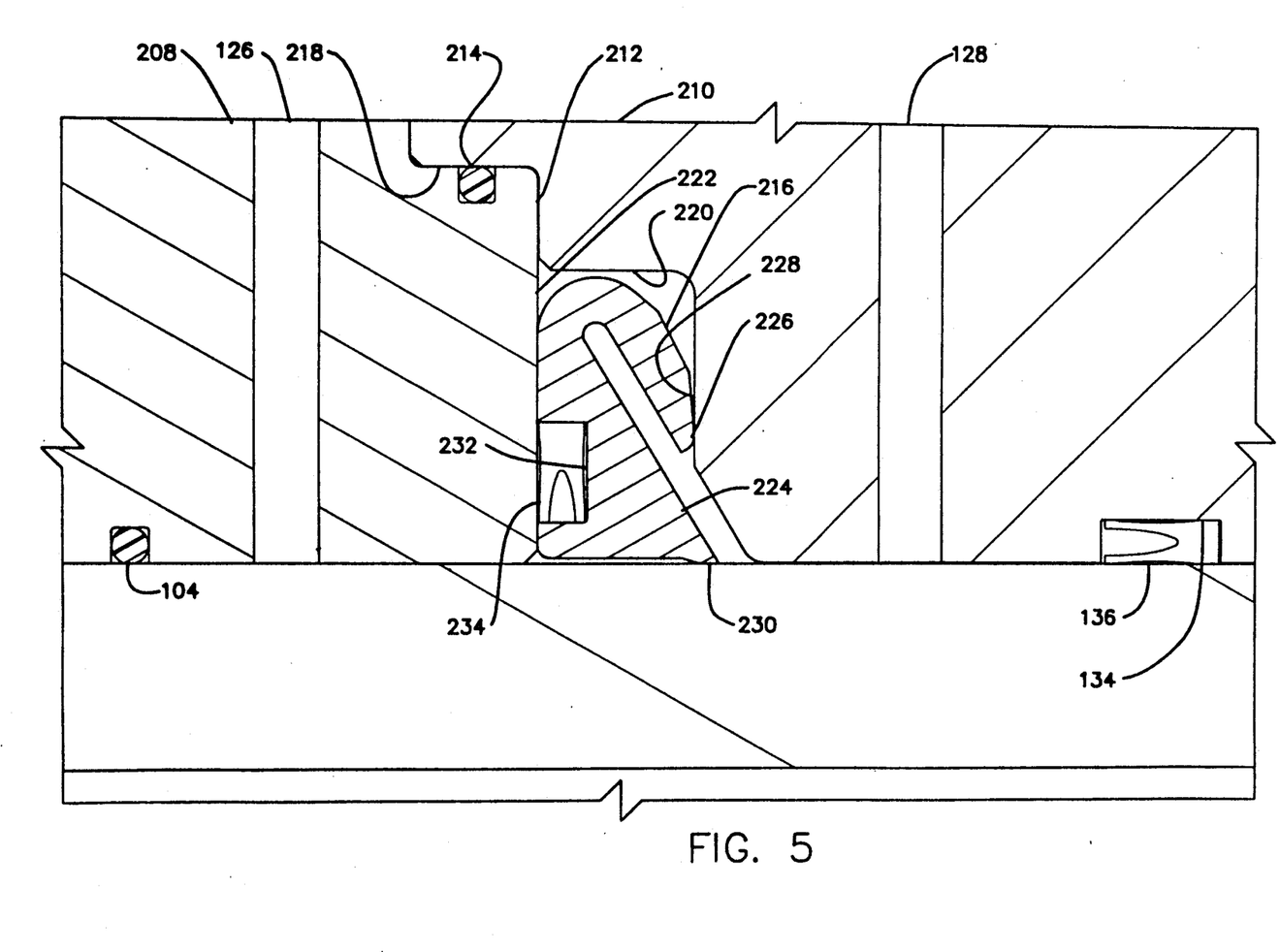
FIG. 5 is an enlarged sectional view of the alternate embodiment of the metal-to-metal seal for the improved length compensating joint and its associated hydraulic porting.

As best seen in FIG. 5, the interior of flange 210 of end spool 206 is stepped with axially spaced counterbores 218 and 220 therein. Raised annular portion 212 of flange 208 is closely received within bore 218 with seal means 214 sealing therein. Seal 216 sits in the annular area defined by bore 220 and end face 222 of flange 208. Seal 216 is generally C shaped in cross section with a thicker triangularly shaped base portion 224. The apex 226 of seal 216 contacts flange 210 at seal face 228 to provide an initial metal-to-metal seal within end spool 206. Lower tip 230 of base portion 224 contacts inner member 12 to provide an initial metal-to-metal seal. Seal groove 232 is disposed on the lower face of base portion 224 with elastomeric seal 234 oriented therein as shown.

The sequence of operations for using the second embodiment of the improved length compensating joint 200 is the same as for the preferred embodiment. The metal-to-metal seal 216 is deenergized by supplying pressurized fluid through port 126, moving lower tip 230 out of sealing engagement with inner member 12. Elastomeric lip seal 136 and O ring 102 maintain sealing contact with inner member 12 and port 128 is blocked, thereby maintaining seal 216 in a deenergized position. Pressurized fluid can then be applied to port 48 or 108 to shorten or lengthen the length compensating joint 200 as required. Once the desired position is reached, pressure can be released from port 126 to reenergize seal 216. Lock assembly 28 can then be activated as described previously.

What is claimed is:

1. An improved length compensating joint, comprising:
   an inner tubular member,
   an outer tubular member receiving said inner member in close surrounding relationship,
   a sealing means disposed between said inner and outer tubular members defining joint extension and retraction chambers,
   a means for supplying fluid under pressure to said extension and retraction chambers to permit selective relative movement between said inner and outer members,
   a gripping means positioned on said outer tubular member,
   a pressure responsive camming means cooperating with said gripping means to lock and release said gripping means to said inner member,
   a metal-to-metal seal for sealing between said inner and outer tubular members wherein said metal-to-metal seal is a shaped annular ring with a pair of unequal length seal legs extending therefrom which face in the direction of internal pressure from the inner member and provide an initial metal-to-metal seal between parallel surfaces on said inner and outer tubular members,
   said metal-to-metal seal is initially energized by an interference fit between said inner and outer tubular members, and
   a means for radially deenergizing said metal-to-metal seal during extension and retraction operations wherein said deenergizing means includes:
   a radially directed passage providing fluid communication with the exterior and interior of said metal-to-metal seal,
   a porting means for supplying fluid under pressure to said passage, and
   an elastomeric seal means disposed on the exterior and interior of said metal-to-metal seal to allow pressurization of the interior of said metal-to-metal seal legs to disengage said interior leg from sealing engagement with said inner member during relative axial movement between said inner and outer members.

2. A length compensating joint according to claim 1 including
   a means for pressure testing said metal-to-metal seal with a sealing means between said inner and outer members axially displaced from said sealing legs in the direction of said internal pressure from said inner member,
   a sealing means on the interior of said shaped annular ring,
   a porting means for supplying fluid under pressure between said metal-to-metal seal legs and said sealing means, and
   a porting means for detecting leakage past said seal legs.

3. An improved length compensating joint, comprising:
   an inner tubular member,
   an outer tubular member receiving said inner member in close surrounding relationship,
   a sealing means disposed between said inner and outer tubular members defining joint extension and retraction chambers,
   a means for supplying fluid under pressure to said extension and retraction chambers to permit selective relative movement between said inner and outer members,
   a gripping means positioned on said outer tubular member,
   a pressure responsive camming means cooperating with said gripping means to lock and release said gripping means to said inner member,
   a metal-to-metal seal for sealing between said inner and outer tubular members wherein said metal-to-metal seal is a shaped annular ring with a triangularly shaped base portion with a pair of sealing legs which face in the direction of pressure from the inner member and includes an apex sealing against an annular surface on said outer member which is perpendicular to its axis and a lower tip on said base portion sealing against a cylindrical surface on said inner member which is parallel with its axis, said metal-to-metal seal is initially energized by an interference fit between said inner and outer tubular members, and a means for radially deenergizing said metal-to-metal seal during extension and retraction operations.

4. A metal-to-metal seal according to claim 3 wherein said deenergizing means includes:

sealing means disposed between said inner and outer members and axially spaced from said metal-to-metal seal legs, sealing means disposed on said triangularly shaped base portion of said metal-to-metal seal which in combination with said axially spaced sealing means define an annular chamber for pressurization of the interior of said metal-to-metal seal leg, and porting means for supplying fluid under pressure to said annular chamber to disengage said leg from sealing engagement with said inner member during relative axial movement between said inner and outer members.

5. A length compensating joint according to claim 4 wherein said metal-to-metal seal includes;

a means for pressure testing said metal-to-metal seal with a sealing means between said inner and outer members axially displaced from said sealing legs in the direction of said internal pressure from said inner member, porting means for supplying fluid under pressure between said metal-to-metal seal and said sealing means, and porting means for detecting leakage past said seal legs.

* * * * *